US010608764B2

United States Patent
Chaloupka et al.

(10) Patent No.: US 10,608,764 B2
(45) Date of Patent: Mar. 31, 2020

(54) METHODS AND SYSTEMS FOR SYNCHRONIZATION USING DELAY ASYMMETRY

(71) Applicants: Khalifa University of Science, Technology, and Research, Abu Dhabi (AE); British Telecommunications plc, London (GB); Emirates Telecommunications Corporation, Abu Dhabi (AE)

(72) Inventors: Zdenek Chaloupka, Noordwijk (NL); Ivan Boyd, Abu Dhabi (AE)

(73) Assignees: Khalifa University of Science and Technology, Abu Dhabi (AE); British Telecommunications PLC, London (GB); Emirates Telecommunications Corporation, Abu Dhabi (AE)

( * ) Notice: Subject to any disclaimer, the term of this patent is extended or adjusted under 35 U.S.C. 154(b) by 0 days.

(21) Appl. No.: 15/358,229

(22) Filed: Nov. 22, 2016

(65) Prior Publication Data
US 2018/0145781 A1    May 24, 2018

(51) Int. Cl.
*H04J 3/06* (2006.01)
(52) U.S. Cl.
CPC .......... *H04J 3/0667* (2013.01); *H04J 3/0644* (2013.01)
(58) Field of Classification Search
CPC .............................. H04J 3/0667; H04J 3/0644
See application file for complete search history.

(56) References Cited

U.S. PATENT DOCUMENTS

| 9,112,628 B2 * | 8/2015 | Aweya ................. H04J 3/0667 |
| 9,184,861 B2 * | 11/2015 | Aweya ................. H04J 3/0667 |
| 2015/0092794 A1 | 4/2015 | Aweya et al. |

FOREIGN PATENT DOCUMENTS

WO    WO 2015049481 A1 *  4/2015  ............ H04J 3/0667

OTHER PUBLICATIONS

"Evaluation of Kalman Filtering for Network Time Keeping", Aggelos Bletsas, IEEE Transactions on Ultrasonics, Ferroelectrics, and Frequency Control, vol. 52, No. 9, Sep. 2005.
International Search Report and Written Opinion, PCT/GB2016/053631, dated Sep. 5, 2017.
Clock Synchronization Over Communication paths with Queue-Induced Delay Asymmetries; Chaloupka Zdenek et al; IEEE Communications Letters, IEEE Service Center, Piscataway, NJ, US, vol. 18, No. 9, Sep. 1, 2014, pp. 1551-1554.

(Continued)

*Primary Examiner* — Peter P Chau
(74) *Attorney, Agent, or Firm* — Calfee, Halter & Griswold LLP (57) ABSTRACT

This invention relates to methods and devices for timing synchronization. The invention has particular application where timing is being carried out over packet networks using, for example, the IEEE 1588 Precision Time Protocol (PTP). Embodiments of the invention make use of estimated forward and reverse path delay asymmetries directly in the estimation algorithm (for example a Kalman filter). This can allow the variation in the timestamps which have been compensated for the delay asymmetry to be significantly reduced, which can reduce the complexity of the phase offset estimation algorithm.

10 Claims, 4 Drawing Sheets

(56) References Cited

OTHER PUBLICATIONS

Improving the PTP Synchronization Accuracy Under Asymmetric Delay Conditions; Levesque Martin et al.; 2015 IEEE International Symposium on Precision Clock Synchronization for Measurement Control and Communication (ISPCS), IEEE, Oct. 11, 2015, pp. 88-93.

* cited by examiner

METHODS AND SYSTEMS FOR SYNCHRONIZATION USING DELAY ASYMMETRY

FIELD OF THE INVENTION

The present invention relates to methods and systems for synchronization taking into account delay asymmetry. It is particularly, but not exclusively, related to methods and systems which make use of the delay asymmetry to improve the accuracy of the estimation algorithm used to estimate the phase offset in a synchronization algorithm (for example under IEEE 1588 PTP).

BACKGROUND OF THE INVENTION

Timing synchronization using a protocol such as IEEE 1588 PTP and a well-designed slave clock recovery mechanism can provide time synchronization in the sub-microsecond level and lower. Time synchronization requires an accurate measurement of the communication path delay between the time server (master) and the client (slave) in order to compute the time offset between them.

Figure 1:
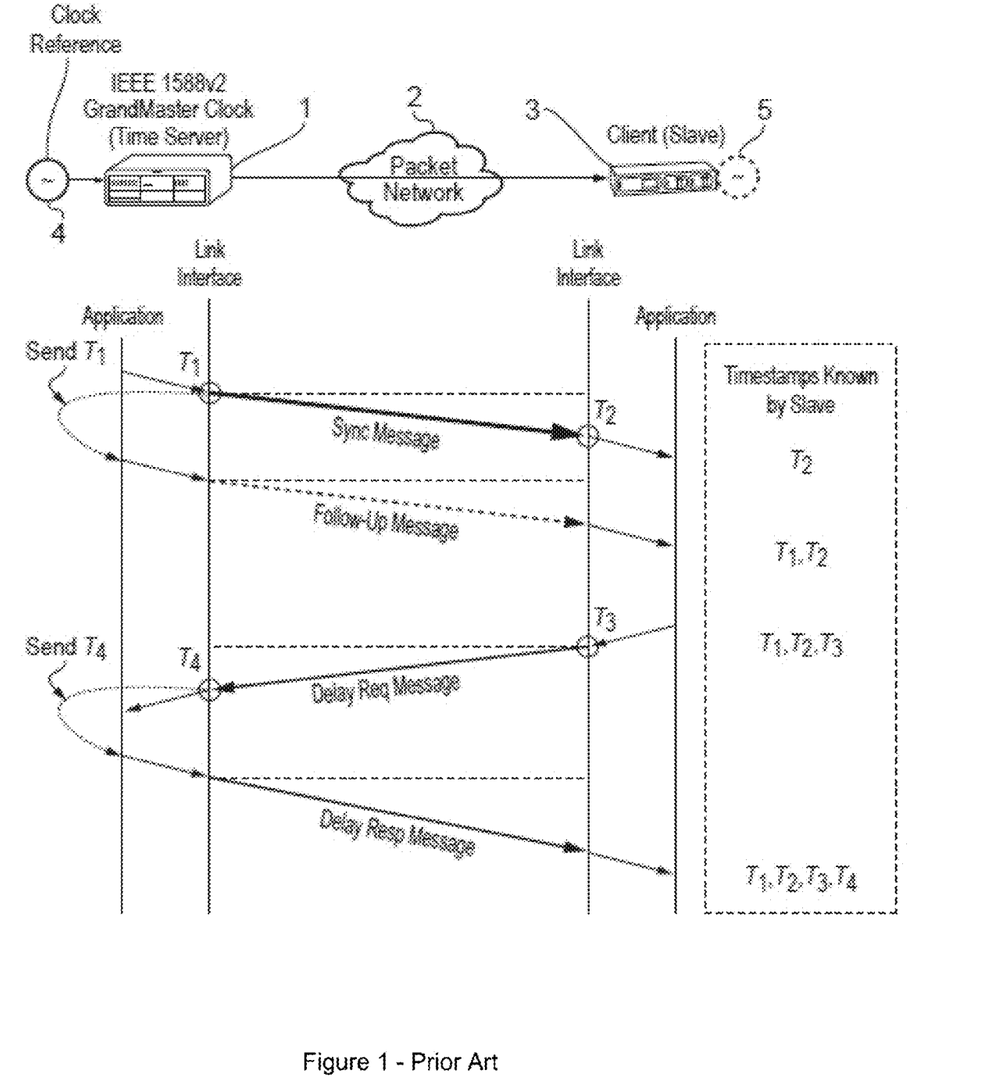
FIG. 1 shows the sequence of messages in a two-step clock synchronisation method under IEEE 1588 PTP and has already been described.

The PTP message exchange process (i.e., the PTP Delay Request/Delay Response flow) between a master and a slave is illustrated in FIG. 1 and described below.

IEEE 1588 PTP allows for two different types of timestamping methods, either one-step or two-step. One-step clocks update time information within event messages (Sync and Delay_Req) on-the-fly, while two-step clocks convey the precise timestamps of packets in general messages (Follow_Up and Delay_Resp). A Sync message is transmitted by a master 1 to its slaves 3 and either contains the exact time of its transmission or is followed by a Follow_Up message containing this time. In a two-step ordinary or boundary clock, the Follow_Up message communicates the value of the departure timestamp for a particular Sync message.

FIG. 1 illustrates the basic pattern of synchronization message exchanges for the two-step clocks. The master 1 sends a Sync message to the slave 3 over the packet network 2 and notes the time $T_1$ at which it was sent. The slave receives the Sync message and notes the time of reception $T_2$. The master 1 conveys to the slave 3 the timestamp $T_1$ by one of two ways: 1) Embedding the timestamp $T_1$ in the Sync message. This requires some sort of hardware processing (i.e., hardware timestamping) for highest accuracy and precision. 2) Embedding the timestamp $T_1$ a Follow_Up message which is the sent to the slave (as shown in FIG. 1). Next, the slave 3 sends a Delay_Req message to the master 1 and notes the time $T_3$ at which it was sent. The master receives the Delay_Req message and notes the time of reception $T_4$. The master 1 conveys to the slave 3 the timestamp $T_4$ by embedding it in a Delay_Resp message.

At the end of this PTP message exchange, the slave 3 possesses all four timestamps $\{T_1, T_2, T_3, T_4\}$. These timestamps may be used to compute the offset of the slave's clock 5 with respect to the master clock 4 and the mean propagation time of messages between the two clocks. The computation of offset and propagation time assumes that the master-to-slave and slave-to-master propagation times are equal, i.e. that there is a symmetrical communication path. Clock frequencies change over time, so periodic message exchanges are required. Because these clock variations change slowly, the period between message exchanges is typically on the order of milliseconds to seconds.

In most existing approaches, the path delay estimation is based on the important assumption that the time delay from master to slave is equal to that from slave to master. However, in reality, the communication paths are not perfectly symmetric, mainly due to dissimilar forward and reverse physical link delays and queuing delays. Even in cases where the physical link delays are known and properly compensated for during clock synchronization, queuing delays, which are variable, can still exist when timing messages go through the packet network and are queued for forwarding. In particular, the processing and buffering of packets in network devices (switches, routers, etc.) introduce variations in the time latency of packets traversing the packet network. This mainly happens when timing transfer is done in an end-to-end manner without any form of timing assistance from the network to help mitigate the effects of the variable queuing delays.

Variable queueing delays and any asymmetry in the forward and reverse queuing delays directly lead to increased errors in the phase offset estimation between a master and slave.

U.S. Pat. No. 9,112,628B describes a technique which enables the forward queueing delays to be approximately tracked sample-by-sample within a window but with an unknown fixed offset for the duration of the window. Similarly, the reverse queueing delays can be approximately tracked sample-by-sample but with a different unknown offset. In U.S. Pat. No. 9,112,628B these forward and backward queue delay (and offset) approximations are used in an additional step after the Kalman filter estimation of phase offset to modify and improve the estimate.

U.S. Pat. No. 9,112,628B discusses how the error in the phase offset estimation error, which is caused by queueing delay asymmetry, can be used to produce a phase offset estimate which more accurately represents the true phase offset between master and slave. This delay asymmetry compensation process is applied after the Kalman filter estimation of the phase offset as illustrated by equation 4 and the subsequent discussion in that document. Equation 25 of that document also suggests that the measurement noise should be coloured by the difference between the change in the forward delay between consecutive samples and the change in the reverse delay between consecutive samples, i.e., by $\Delta q_f(n) - \Delta q_r(n)$.

U.S. Pat. No. 9,184,861B uses the variance of the difference between the forward and reverse message packet delay variations ("PDVs") as the measurement noise term for the Kalman filter realisation. This measurement noise term is used directly by the Kalman filter estimation algorithm. The approach in U.S. Pat. No. 9,184,861 B2 is to accept that there is noise introduced by the queueing delays and then try to represent this noise faithfully.

An object of the present invention is to provide an improved way of accounting for the delay asymmetry when estimating the phase offset of a slave clock.

A further object of the present invention is to provide a way of maintaining the accuracy of estimations during periods of high load on one of the forward and reverse channels in a timing network.

SUMMARY OF THE INVENTION

An exemplary embodiment of the invention provides a method of estimating a phase offset of a local clock in a time client compared with a master clock in a time server connected to the time client over a network, the method including the steps of: sending first timing messages in a forward direction from the time server to the time client and second timing messages in a reverse direction from the time client to the time server, and recording timestamps which are the times of sending and times of receipt of the timing messages; estimating, for each message in a window of predetermined length, the transmission delay experienced by the message; determining, from said estimates, a minimum estimated delay experienced by timing messages in the forward direction in that window, and a minimum estimated delay experienced by timing messages in the reverse direction in that window; determining, for each message in that window, the difference between the estimated transmission delay for that message and the minimum estimated delay for messages travelling in the same direction as that message; determining, from said differences, a queuing asymmetry measure for each exchange of first and second timing messages in that window; estimating the phase offset of the local clock at a time in said window using said timestamps and said queuing asymmetry measure as inputs to an estimation algorithm.

A further exemplary embodiment of the invention provides a time client having a local clock and a processor, and connected over a network to a time server having a master clock, wherein the time client is arranged to: receive first timing messages sent in a forward direction from the time server to the time client; and send second timing messages in a reverse direction from the time client to the time server, record timestamps which are the times of sending and times of receipt of the timing messages by the time client; and receive timestamps which are the times of sending and the times of receipt of the timing messages by the time server, wherein the processor is arranged to: estimate, for each message in a window of predetermined length, the transmission delay experienced by the message; determine, from said estimates, a minimum estimated delay experienced by timing messages in the forward direction in that window, and a minimum estimated delay experienced by timing messages in the reverse direction in that window; determine, for each message in that window, the difference between the estimated transmission delay for that message and the minimum estimated delay for messages travelling in the same direction as that message; determine, from said differences, a queuing asymmetry measure for each exchange of first and second timing messages in that window; estimate the phase offset of the local clock at a time in said window using said timestamps and said queuing asymmetry measure as inputs to an estimation algorithm.

A further exemplary embodiment of the invention provides a networked time system having: a time server having a master clock; a time client having a local clock and a processor, and a network connecting the time server and the time client, wherein the time server is arranged to: send first timing messages in a forward direction to the time client, and receive second timing messages sent in a reverse direction from the time client, record timestamps which are the times of sending and times of receipt of the timing messages by the time server, and send said timestamps to the time client, wherein the time client is arranged to: receive said first timing messages; and send said second timing messages to the time server, record timestamps which are the times of sending and times of receipt of the timing messages by the time client; and receive timestamps which are the times of sending and the times of receipt of the timing messages by the time server, wherein the processor is arranged to: estimate, for each message in a window of predetermined length, the transmission delay experienced by the message; determine, from said estimates, a minimum estimated delay experienced by timing messages in the forward direction in that window, and a minimum estimated delay experienced by timing messages in the reverse direction in that window; determine, for each message in that window, the difference between the estimated transmission delay for that message and the minimum estimated delay for messages travelling in the same direction as that message; determine, from said differences, a queuing asymmetry measure for each exchange of first and second timing messages in that window; estimate the phase offset of the local clock at a time in said window using said timestamps and said queuing asymmetry measure as inputs to an estimation algorithm.

BRIEF DESCRIPTION OF THE DRAWINGS

Embodiments of the invention will now be described by way of example with reference to the accompanying drawings in which.

DETAILED DESCRIPTION

At their broadest, aspects of the present invention provide for methods and systems which estimate the phase offset of a slave clock by taking into account an estimated measure of the asymmetry in the transmission paths between the time server and the time client.

A first aspect of the present invention provides a method of estimating a phase offset of a local clock in a time client compared with a master clock in a time server, connected to the time client over a network, the method including the steps of: sending first timing messages in a forward direction from the time server to the time client and second timing messages in a reverse direction from the time client to the time server, and recording timestamps which are the times of sending and times of receipt of the timing messages; estimating, for each message in a window of predetermined length, the transmission delay experienced by the message; determining, from said estimates, a minimum estimated delay experienced by timing messages in the forward direction in that window, and a minimum estimated delay experienced by timing messages in the reverse direction in that window; determining, for each message in that window, the difference between the estimated transmission delay for that message and the minimum estimated delay for messages travelling in the same direction as that message; determining, from said differences, a queuing asymmetry measure for each exchange of first and second timing messages in that window; estimating the phase offset of the local clock at a time in said window using said timestamps and said queuing asymmetry measure as inputs to an estimation algorithm.

The network may be a packet network (using technologies such Ethernet, IP, MPLS, etc.).

The timing messages are preferably timing messages under the IEEE 1588 Precision Time Protocol (PTP).

By using a method according to the present aspect, the noise introduced by the queueing delays can be reduced by using the estimations of the queueing delays.

Thus the method according to this aspect may significantly reduce the errors in phase offset estimation which result from variable and asymmetrical queueing delays.

In particular, the method of the present aspect preferably uses a queuing asymmetry measure (preferably based on good estimations of the difference in the forward and reverse delays) directly in an estimation algorithm (such as a Kalman filter algorithm) as an integral part of the estimation process, rather than as a modifier to be applied after the operation of the estimation algorithm. This can lead to efficiencies in that the estimate algorithm is able to converge on a solution much faster and arrive at a more accurate solution in the time available.

In certain embodiments, the queuing asymmetry measure may be determined as: $Q(n)=[(\hat{q}_f(n)-\hat{q}_{fmin})-(\hat{q}_r(n)-\hat{q}_{rmin})]$, wherein: $\hat{q}_f(n)$ is an estimate of the queuing delay experienced by the n-th first timing message; $\hat{q}_r(n)$ is an estimated of the queuing delay experienced by the n-th second timing message; $\hat{q}_{fmin}$ is the determined minimum value of $\hat{q}_f(n)$ in said window; and $\hat{q}_{rmin}$ is the determined minimum value of $\hat{q}_r(n)$ in said window.

This particular queuing asymmetry measure has been found to be particularly close to the true queuing asymmetry in the delay for a particular pair of timing messages, whilst being calculated from values which are readily determined from the message exchange and estimations obtained in the method of the present aspect.

In certain embodiments the step of determining the queuing asymmetry measure includes: determining, from said timestamps, a forward displacement factor which is the difference between the interval between the times of receipt of successive first timing messages by the client and the interval between the times of sending of said successive first messages by the server; determining, from said timestamps, a reverse displacement factor which is the difference between the interval between the times of receipt of successive second timing messages by the server and the interval between the times of sending of said successive second timing messages by the client; maintaining a running sum of said forward displacement factors over a predetermined time period; maintaining a running sum of reverse displacement factors over a predetermined time period; and calculating the queuing asymmetry measure from said sums.

In preferred embodiments, the estimation algorithm is a Kalman filer, which may, for example, use the measurement equation: $(T_1(n)-T_2(n))+(T_4(n)-T_3(n))+Q(n)=2\theta_E(n)+v_n$, wherein: $T_1(n)$ is the timestamp recorded by the server on sending of an n-th first timing message from the server to the client; $T_2(n)$ is the time of receipt as recorded by the client on receipt of the n-th first timing message; $T_3(n)$ is the timestamp recorded by the client on sending of an n-th second timing message from the client to the server; $T_4(n)$ is the time of receipt as recorded by the server on receipt of the n-th second timing message; $Q(n)$ is the queuing asymmetry measure; $v_n$ is the measurement noise; and $\theta_E(n)$ is an estimate of the local clock offset.

By inputting the queuing asymmetry measure directly into the calculations of the Kalman filter, the Kalman filter may converge much more rapidly on its solution.

The method may further include determining the load conditions on the forward and reverse transmission paths. This may be of particular benefit in allowing stored values for minimum delays or minimum displacements from times when the load conditions are determined to be low to generate better estimates of minimum delays or minimum displacements when one of the transmission paths has high load conditions.

The load conditions on a particular path can cause significant bias and/or error in estimating minimum values and this can lead to errors or inefficiency in estimating phase offset. By storing minima during periods of low load conditions, these minima can be used later to estimate the "true" minima when a path is under high load and may be more accurate than the minimum determined from the timing messages sent under those conditions.

In particular embodiments, the method may further include the steps of: determining, from said timestamps, a forward displacement factor which is the difference between the interval between the times of receipt of successive first timing messages by the client and the interval between the times of sending of said successive first messages by the server; determining, from said timestamps, a reverse displacement factor which is the difference between the interval between the times of receipt of successive second timing messages by the server and the interval between the times of sending of said successive second timing messages by the client; maintaining a running sum of said forward displacement factors over a predetermined time period; maintaining a running sum of reverse displacement factors over a predetermined time period; determining a noise condition of the forward transmission path and a noise condition of the reverse transmission path over said predetermined time period; if it is determined that both the forward and reverse transmission paths have a low noise condition during said predetermined time period, determining a minimum of the sum of forward displacement factors and a minimum of the sum of reverse displacement factors over that period of time and storing the determined minima as reference minimum values; and if it is determined during a future time period that one of the forward or reverse transmission paths has a high noise condition, whilst the other path has a low noise condition, using said reference minimum values and the minimum of the sum of displacement factors on the path with a low noise condition to estimate a minimum value for the sum of displacement factors on the path with a high noise condition.

The step of determining a noise condition on a transmission path may involve: calculating, based on the timestamps, a variance of a queuing delay on that path; applying a first moving average having a first time constant to the variance; applying a second moving average having a second time constant greater than the first time constant to the variance; calculating a difference between the first and second moving averages; and comparing the calculated difference to a threshold to determine a noise condition on the path.

For example, the moving averages may be exponentially-weighted moving averages (EWMAs).

Using a pair of moving averages allows determination of whether the current noise conditions (as represented by the moving average with the shorter time constant) have changed from an earlier steady-state period (as represented by the moving average with the longer time constant).

The threshold can be set a-priori if the conditions of the detection environment are known in advance or the threshold can be determined experimentally during operation (or a combination of both may be employed).

An alternative way of determining the noise conditions is to use the error variance-covariance matrix from a Kalman filter which is used in said estimation algorithm. This matrix is normally referred to as P and is a square matrix with the form $$P = \begin{matrix} P_{11} & P_{12} \\ P_{21} & P_{22} \end{matrix}$$

where $P_{11}$ is the error variance of the phase offset, $P_{22}$ is the error variance of the skew (fractional frequency offset), and $P_{12}$ and $P_{21}$ represent the error covariance between the phase offset and the skew.

Thus in some embodiments of the invention, the determination of a noise condition on a transmission path involves: determining the error variance-covariance matrix $$P = \begin{matrix} P_{11} & P_{12} \\ P_{21} & P_{22} \end{matrix}$$

from a Kalman filter which is used in said estimation algorithm, where $P_{11}$ is the error variance of the phase offset, $P_{22}$ is the error variance of the skew (fractional frequency offset), and $P_{12}$ and $P_{21}$ represent the error covariance between the phase offset and the skew.

As the value $P_{22}$ depends on the oscillator's stability, its variance, i.e., the variance of the $P_{22}$ term itself, is extremely low (almost non-existent). $P_{22}$ changes significantly only due to the external noise (and the primary external noise input is typically caused by forward and/or backward traffic load changes).

When external noise changes occur (e.g. the traffic load changes), $P_{22}$ reflects this by converging to a new stable level of error variance. Due to the filtering properties of the Kalman filter, this new level is, again, very stable (i.e., there is almost no variance). However, the magnitude of the new level will be very distinct from the previous state, provided there was a significant enough change in the noise conditions. Therefore, $P_{22}$ can be employed as input provide reliable indications of changing load conditions.

The method of the present aspect may include any combination of some, all or none of the above described preferred and optional features.

The method of the above aspect is preferably implemented by a time client according to the second aspect of this invention or a networked time system according to the third aspect of this invention, as described below, but need not be.

Further aspects of the present invention include computer programs for running on computer systems which carry out the method of the above aspect, including some, all or none of the preferred and optional features of that aspect.

A second aspect of the present invention provides a time client having a local clock and a processor, and connected over a network to a time server having a master clock, wherein the time client is arranged to: receive first timing messages sent in a forward direction from the time server to the time client; and send second timing messages in a reverse direction from the time client to the time server, record timestamps which are the times of sending and times of receipt of the timing messages by the time client; and receive timestamps which are the times of sending and the times of receipt of the timing messages by the time server, wherein the processor is arranged to: estimate, for each message in a window of predetermined length, the transmission delay experienced by the message; determine, from said estimates, a minimum estimated delay experienced by timing messages in the forward direction in that window, and a minimum estimated delay experienced by timing messages in the reverse direction in that window; determine, for each message in that window, the difference between the estimated transmission delay for that message and the minimum estimated delay for messages travelling in the same direction as that message; determine, from said differences, a queuing asymmetry measure for each exchange of first and second timing messages in that window; estimate the phase offset of the local clock at a time in said window using said timestamps and said queuing asymmetry measure as inputs to an estimation algorithm.

The network may be a packet network (using technologies such Ethernet, IP, MPLS, etc.).

The timing messages are preferably timing messages under the IEEE 1588 Precision Time Protocol (PTP).

In the time client according to the present aspect, the noise introduced by the queueing delays and the corresponding effects on offset estimation can be reduced by using the estimations of the queueing delays.

Thus the time client of the present aspect may significantly reduce the errors in phase offset estimation which result from variable and asymmetrical queueing delays.

In particular, the processor of the time client of the present aspect preferably uses a queuing asymmetry measure (preferably based on good estimations of the difference in the forward and reverse delays) directly in an estimation algorithm (such as a Kalman filter algorithm) as an integral part of the estimation process, rather than as a modifier to be applied after the operation of the estimation algorithm. This can lead to efficiencies in that the estimate algorithm is able to converge on a solution much faster and arrive at a more accurate solution in the time available.

In certain embodiments, the processor determines the queuing asymmetry measure as: $Q(n)=[(\hat{q}_f(n)-\hat{q}_{fmin})-(\hat{q}_r(n)-\hat{q}_{rmin})]$, wherein: $\hat{q}_f(n)$ is an estimate of the queuing delay experienced by the n-th first timing message; $\hat{q}_r(n)$ is an estimated of the queuing delay experienced by the n-th second timing message; $\hat{q}_{fmin}$ is the determined minimum value of $\hat{q}_f(n)$ in said window; and $\hat{q}_{rmin}$ is the determined minimum value of $\hat{q}_r(n)$ in said window.

This particular queuing asymmetry measure has been found to be particularly close to the true asymmetry in the delay for a particular pair of timing messages, whilst being calculated from values which are readily determined from the message exchange and estimations obtained in the method of the present aspect.

In certain embodiments the processor is arranged to determine the queuing asymmetry measure by: determining, from said timestamps, a forward displacement factor which is the difference between the interval between the times of receipt of successive first timing messages by the client and the interval between the times of sending of said successive first messages by the server; determining, from said timestamps, a reverse displacement factor which is the difference between the interval between the times of receipt of successive second timing messages by the server and the interval between the times of sending of said successive second timing messages by the client; maintaining a running sum of said forward displacement factors over a predetermined time period; maintaining a running sum of reverse displacement factors over a predetermined time period; and calculating the queuing asymmetry measure from said sums.

In preferred embodiments, the estimation algorithm is a Kalman filer, which may, for example, use the measurement equation: $(T_1(n)-T_2(n))+(T_4(n)-T_3(n))+Q(n)=2\theta_E(n)+v_n$, wherein: $T_1(n)$ is the timestamp recorded by the server on sending of an n-th first timing message from the server to the client; $T_2(n)$ is the time of receipt as recorded by the client on receipt of the n-th first timing message; $T_3(n)$ is the timestamp recorded by the client on sending of an n-th second timing message from the client to the server; $T_4(n)$ is the time of receipt as recorded by the server on receipt of the n-th second timing message; Q(n) is the queuing asymmetry measure; $v_n$ is the measurement noise; and $\theta_E(n)$ is an estimate of the local clock offset.

By inputting the queuing asymmetry measure directly into the calculations of the Kalman filter, the Kalman filter may converge much more rapidly on its solution.

The processor may be further arranged to determine the load conditions on the forward and reverse transmission paths. This may be of particular benefit in allowing stored values for minimum delays or minimum displacements from times when the load conditions are determined to be low to generate better estimates of minimum delays or minimum displacements when one of the transmission paths has high load conditions.

The load conditions on a particular path can cause significant bias and/or error in estimating minimum values and this can lead to errors or inefficiency in estimating phase offset. By storing minima during periods of low load conditions, these minima can be used to estimate the "true" minima when a path is under high load and may be more accurate than the minimum determined from the timing messages sent under those conditions.

In particular embodiments, the processor is further arranged to: determine, from said timestamps, a forward displacement factor which is the difference between the interval between the times of receipt of successive first timing messages by the client and the interval between the times of sending of said successive first messages by the server; determine, from said timestamps, a reverse displacement factor which is the difference between the interval between the times of receipt of successive second timing messages by the server and the interval between the times of sending of said successive second timing messages by the client; maintain a running sum of said forward displacement factors over a predetermined time period; maintain a running sum of reverse displacement factors over a predetermined time period; determine a noise condition of the forward transmission path and a noise condition of the reverse transmission path over said predetermined time period; if it is determined that both the forward and reverse transmission paths have a low noise condition during said predetermined time period, determine a minimum of the sum of forward displacement factors and a minimum of the sum of reverse displacement factors over that period of time and store the determined minima as reference minimum values; and if it is determined during a future time period that one of the forward or reverse transmission paths has a high noise condition, whilst the other path has a low noise condition, use said reference minimum values and the minimum of the sum of displacement factors on the path with a low noise condition to estimate a minimum value for the sum of displacement factors on the path with a high noise condition.

The processor may be arranged to determine a noise condition on a transmission path by: calculating, based on the timestamps, a variance of a queuing delay on that path; applying a first moving average having a first time constant to the variance; applying a second moving average having a second time constant greater than the first time constant to the variance; calculating a difference between the first and second moving averages; and comparing the calculated difference to a threshold to determine a noise condition on the path.

For example, the moving averages may be exponentially-weighted moving averages (EWMAs).

Using a pair of moving averages allows determination of whether the current noise conditions (as represented by the moving average with the shorter time constant) have changed from an earlier steady-state period (as represented by the moving average with the longer time constant).

The threshold can be set a-priori if the conditions of the detection environment are known in advance or the threshold can be determined experimentally during operation (or a combination of both may be employed).

An alternative way of determining the noise conditions is to use the error variance-covariance matrix from a Kalman filter which is used in said estimation algorithm. This matrix is normally referred to as P and is a square matrix with the form $$P = \begin{matrix} P_{11} & P_{12} \\ P_{21} & P_{22} \end{matrix}$$

where $P_{11}$ is the error variance of the phase offset, $P_{22}$ is the error variance of the skew (fractional frequency offset), and $P_{12}$ and $P_{21}$ represent the error covariance between the phase offset and the skew.

Thus in some embodiments of the invention, the processor is arranged to determine a noise condition on a transmission path by: determining the error variance-covariance matrix $$P = \begin{matrix} P_{11} & P_{12} \\ P_{21} & P_{22} \end{matrix}$$

from a Kalman filter which is used in said estimation algorithm, where $P_{11}$ is the error variance of the phase offset, $P_{22}$ is the error variance of the skew (fractional frequency offset), and $P_{12}$ and $P_{21}$ represent the error covariance between the phase offset and the skew.

As the value $P_{22}$ depends on the oscillator's stability, its variance, i.e., the variance of the $P_{22}$ term itself, is extremely low (almost non-existent). $P_{22}$ changes significantly only due to the external noise (and the primary external noise input is typically caused by forward and/or backward traffic load changes).

When external noise changes occur (e.g. the traffic load changes), $P_{22}$ reflects this by converging to a new stable level of error variance. Due to the filtering properties of the Kalman filter, this new level is, again, very stable (i.e., there is almost no variance). However, the magnitude of the new level will be very distinct from the previous state, provided there was a significant enough change in the noise conditions. Therefore, $P_{22}$ can be employed as input provide reliable indications of changing load conditions.

The time client of the present aspect may include any combination of some, all or none of the above described preferred and optional features.

The processor of the time client of the above aspect preferably operates by performing a method according to the first aspect of this invention, as described above, but need not do so.

A further embodiment of the present invention provides a networked time system having: a time server having a master clock; a time client having a local clock and a processor, and a network connecting the time server and the time client, wherein the time server is arranged to: send first timing messages in a forward direction to the time client, and receive second timing messages sent in a reverse direction from the time client, record timestamps which are the times of sending and times of receipt of the timing messages by the time server, and send said timestamps to the time client, wherein the time client is arranged to: receive said first timing messages; and send said second timing messages to the time server, record timestamps which are the times of sending and times of receipt of the timing messages by the time client; and receive timestamps which are the times of sending and the times of receipt of the timing messages by the time server, wherein the processor is arranged to: estimate, for each message in a window of predetermined length, the transmission delay experienced by the message; determine, from said estimates, a minimum estimated delay experienced by timing messages in the forward direction in that window, and a minimum estimated delay experienced by timing messages in the reverse direction in that window; determine, for each message in that window, the difference between the estimated transmission delay for that message and the minimum estimated delay for messages travelling in the same direction as that message; determine, from said differences, a queuing asymmetry measure for each exchange of first and second timing messages in that window; estimate the phase offset of the local clock at a time in said window using said timestamps and said queuing asymmetry measure as inputs to an estimation algorithm.

The network may be a packet network (using technologies such Ethernet, IP, MPLS, etc.).

The timing messages are preferably timing messages under the IEEE 1588 Precision Time Protocol (PTP).

In the time client according to the present aspect, the noise introduced by the queueing delays and the corresponding effects on offset estimation can be reduced by using the estimations of the queueing delays.

Thus the time client of the present aspect may significantly reduce the errors in phase offset estimation which result from variable and asymmetrical queueing delays.

In particular, the processor of the time client of the present aspect preferably uses a queuing asymmetry measure (preferably based on good estimations of the difference in the forward and reverse delays) directly in an estimation algorithm (such as a Kalman filter algorithm) as an integral part of the estimation process, rather than as a modifier to be applied after the operation of the estimation algorithm. This can lead to efficiencies in that the estimate algorithm is able to converge on a solution much faster and arrive at a more accurate solution in the time available.

In certain embodiments, the processor determines the queuing asymmetry measure as: $Q(n)=[(\hat{q}_f(n)-\hat{q}_{fmin})-(\hat{q}_r(n)-\hat{q}_{rmin})]$, wherein: $\hat{q}_f(n)$ is an estimate of the queuing delay experienced by the n-th first timing message; $\hat{q}_r(n)$ is an estimated of the queuing delay experienced by the n-th second timing message; $\hat{q}_{fmin}$ is the determined minimum value of $\hat{q}_f(n)$ in said window; and $\hat{q}_{rmin}$ is the determined minimum value of $\hat{q}_r(n)$ in said window.

This particular queuing asymmetry measure has been found to be particularly close to the true asymmetry in the delay for a particular pair of timing messages, whilst being calculated from values which are readily determined from the message exchange and estimations obtained in the method of the present aspect.

In certain embodiments the processor is arranged to determine the queuing asymmetry measure by: determining, from said timestamps, a forward displacement factor which is the difference between the interval between the times of receipt of successive first timing messages by the client and the interval between the times of sending of said successive first messages by the server; determining, from said timestamps, a reverse displacement factor which is the difference between the interval between the times of receipt of successive second timing messages by the server and the interval between the times of sending of said successive second timing messages by the client; maintaining a running sum of said forward displacement factors over a predetermined time period; maintaining a running sum of reverse displacement factors over a predetermined time period; and calculating the queuing asymmetry measure from said sums.

In preferred embodiments, the estimation algorithm is a Kalman filer, which may, for example, use the measurement equation: $(T_1(n)-T_2(n))+(T_4(n)-T_3(n))+Q(n)=2\theta_E(n)+v_n$, wherein: $T_1(n)$ is the timestamp recorded by the server on sending of an n-th first timing message from the server to the client; $T_2(n)$ is the time of receipt as recorded by the client on receipt of the n-th first timing message; $T_3(n)$ is the timestamp recorded by the client on sending of an n-th second timing message from the client to the server; $T_4(n)$ is the time of receipt as recorded by the server on receipt of the n-th second timing message; $Q(n)$ is the queuing asymmetry measure; $v_n$ is the measurement noise; and $\theta_E(n)$ is an estimate of the local clock offset.

By inputting the queuing asymmetry measure directly into the calculations of the Kalman filter, the Kalman filter may converge much more rapidly on its solution.

The processor may be further arranged to determine the load conditions on the forward and reverse transmission paths. This may be of particular benefit in allowing stored values for minimum delays or minimum displacements from times when the load conditions are determined to be low to generate better estimates of minimum delays or minimum displacements when one of the transmission paths has high load conditions.

The load conditions on a particular path can cause significant bias and/or error in estimating minimum values and this can lead to errors or inefficiency in estimating phase offset. By storing minima during periods of low load conditions, these minima can be used to estimate the "true" minima when a path is under high load and may be more accurate than the minimum determined from the timing messages sent under those conditions.

In particular embodiments, the processor is further arranged to: determine, from said timestamps, a forward displacement factor which is the difference between the interval between the times of receipt of successive first timing messages by the client and the interval between the times of sending of said successive first messages by the server; determine, from said timestamps, a reverse displacement factor which is the difference between the interval between the times of receipt of successive second timing messages by the server and the interval between the times of sending of said successive second timing messages by the client; maintain a running sum of said forward displacement factors over a predetermined time period; maintain a running sum of reverse displacement factors over a predetermined time period; determine a noise condition of the forward transmission path and a noise condition of the reverse transmission path over said predetermined time period; if it is determined that both the forward and reverse transmission paths have a low noise condition during said predetermined time period, determine a minimum of the sum of forward displacement factors and a minimum of the sum of reverse displacement factors over that period of time and store the determined minima as reference minimum values; and if it is determined during a future time period that one of the forward or reverse transmission paths has a high noise condition, whilst the other path has a low noise condition, use said reference minimum values and the minimum of the sum of displacement factors on the path with a low noise condition to estimate a minimum value for the sum of displacement factors on the path with a high noise condition.

The processor may be arranged to determine a noise condition on a transmission path by: calculating, based on the timestamps, a variance of a queuing delay on that path; applying a first moving average having a first time constant to the variance; applying a second moving average having a second time constant greater than the first time constant to the variance; calculating a difference between the first and second moving averages; and comparing the calculated difference to a threshold to determine a noise condition on the path.

For example, the moving averages may be exponentially-weighted moving averages (EWMAs).

Using a pair of moving averages allows determination of whether the current noise conditions (as represented by the moving average with the shorter time constant) have changed from an earlier steady-state period (as represented by the moving average with the longer time constant).

The threshold can be set a-priori if the conditions of the detection environment are known in advance or the threshold can be determined experimentally during operation (or a combination of both may be employed).

An alternative way of determining the noise conditions is to use the error variance-covariance matrix from a Kalman filter which is used in said estimation algorithm. This matrix is normally referred to as P and is a square matrix with the form $$P = \begin{matrix} P_{11} & P_{12} \\ P_{21} & P_{22} \end{matrix}$$

where $P_{11}$ is the error variance of the phase offset, $P_{22}$ is the error variance of the skew (fractional frequency offset), and $P_{12}$ and $P_{21}$ represent the error covariance between the phase offset and the skew.

Thus in some embodiments of the invention, the processor is arranged to determine a noise condition on a transmission path by: determining the error variance-covariance matrix $$P = \begin{matrix} P_{11} & P_{12} \\ P_{21} & P_{22} \end{matrix}$$

from a Kalman filter which is used in said estimation algorithm, where $P_{11}$ is the error variance of the phase offset, $P_{22}$ is the error variance of the skew (fractional frequency offset), and $P_{12}$ and $P_{21}$ represent the error covariance between the phase offset and the skew.

As the value $P_{22}$ depends on the oscillator's stability, its variance, i.e., the variance of the $P_{22}$ term itself, is extremely low (almost non-existent). $P_{22}$ changes significantly only due to the external noise (and the primary external noise input is typically caused by forward and/or backward traffic load changes).

When external noise changes occur (e.g. the traffic load changes), $P_{22}$ reflects this by converging to a new stable level of error variance. Due to the filtering properties of the Kalman filter, this new level is, again, very stable (i.e., there is almost no variance). However, the magnitude of the new level will be very distinct from the previous state, provided there was a significant enough change in the noise conditions. Therefore, $P_{22}$ can be employed as input provide reliable indications of changing load conditions.

The system of the present aspect may include any combination of some, all or none of the above described preferred and optional features.

The processor of the time client of the above aspect preferably operates by performing a method according to the first aspect of this invention, as described above, but need not do so.

Basic Clock Model

Figure 2:
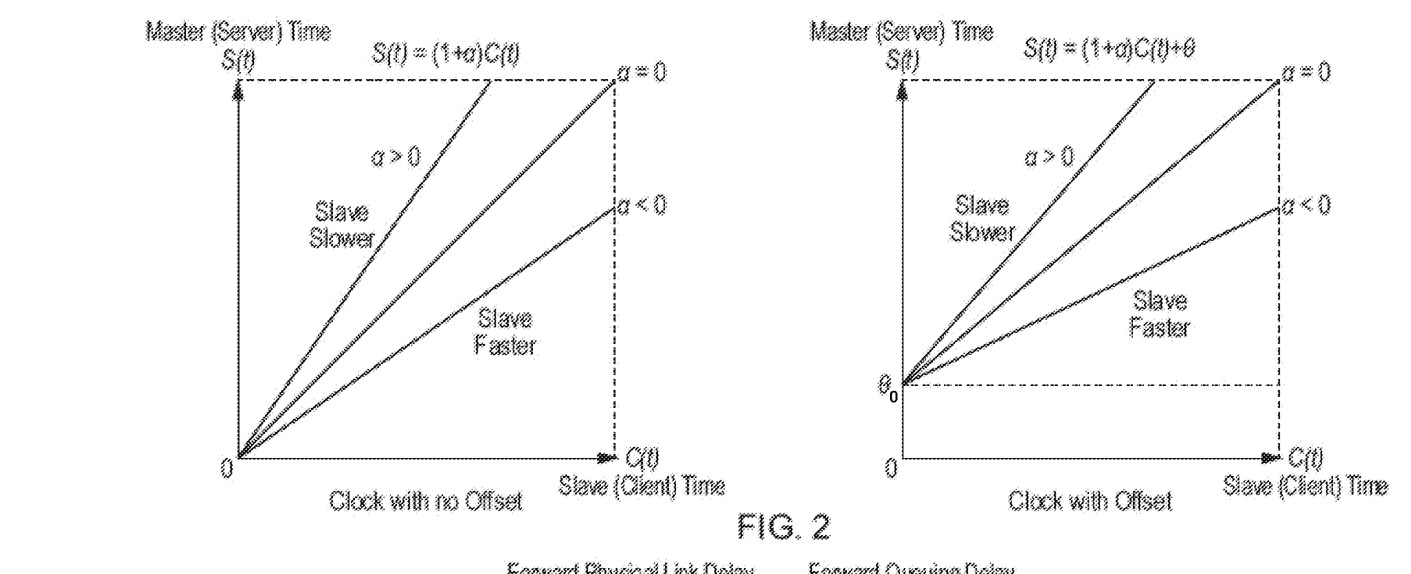
FIG. 2 shows the relationship between master and slave clocks in situations with and without offset.

In order to consider the synchronization problem, we can define a generalized clock offset and skew equation for this problem. It is assumed that, at any particular time instant, the instantaneous view of the relationship between the master (server) clock 4 with timeline S(t) and the slave (client) clock 5 with timeline C(t), can be described by the well-know simple skew clock model depicted in FIG. 2, and described by the equation, $$S(t) = (1+\alpha(t))C(t) + \theta_0,$$

where the skew α is a very small quantity in the order of parts-per-million. This snapshot is an instantaneous view of how well the two clocks are (mis)aligned. FIG. 2 illustrates the influence of $\theta_0$ and α on the alignment.

Figure 3:
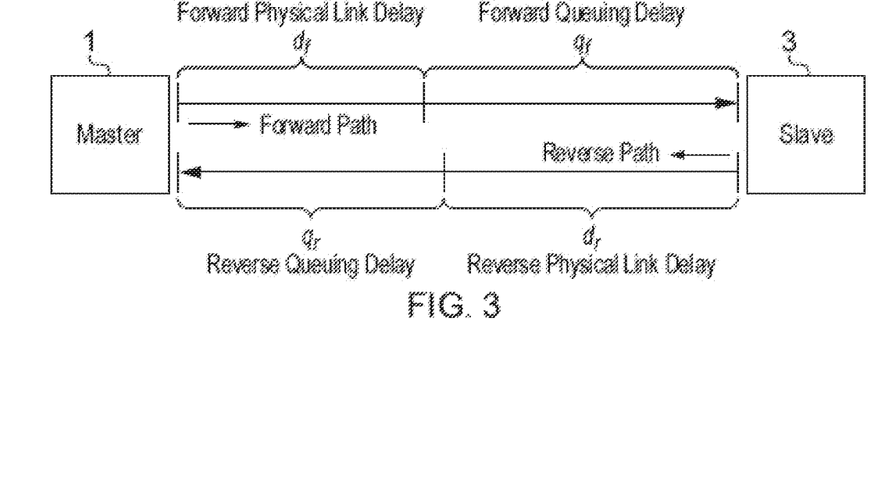
FIG. 3 illustrates the path delays that may exist on communications between a master and slave.
Figure 4:
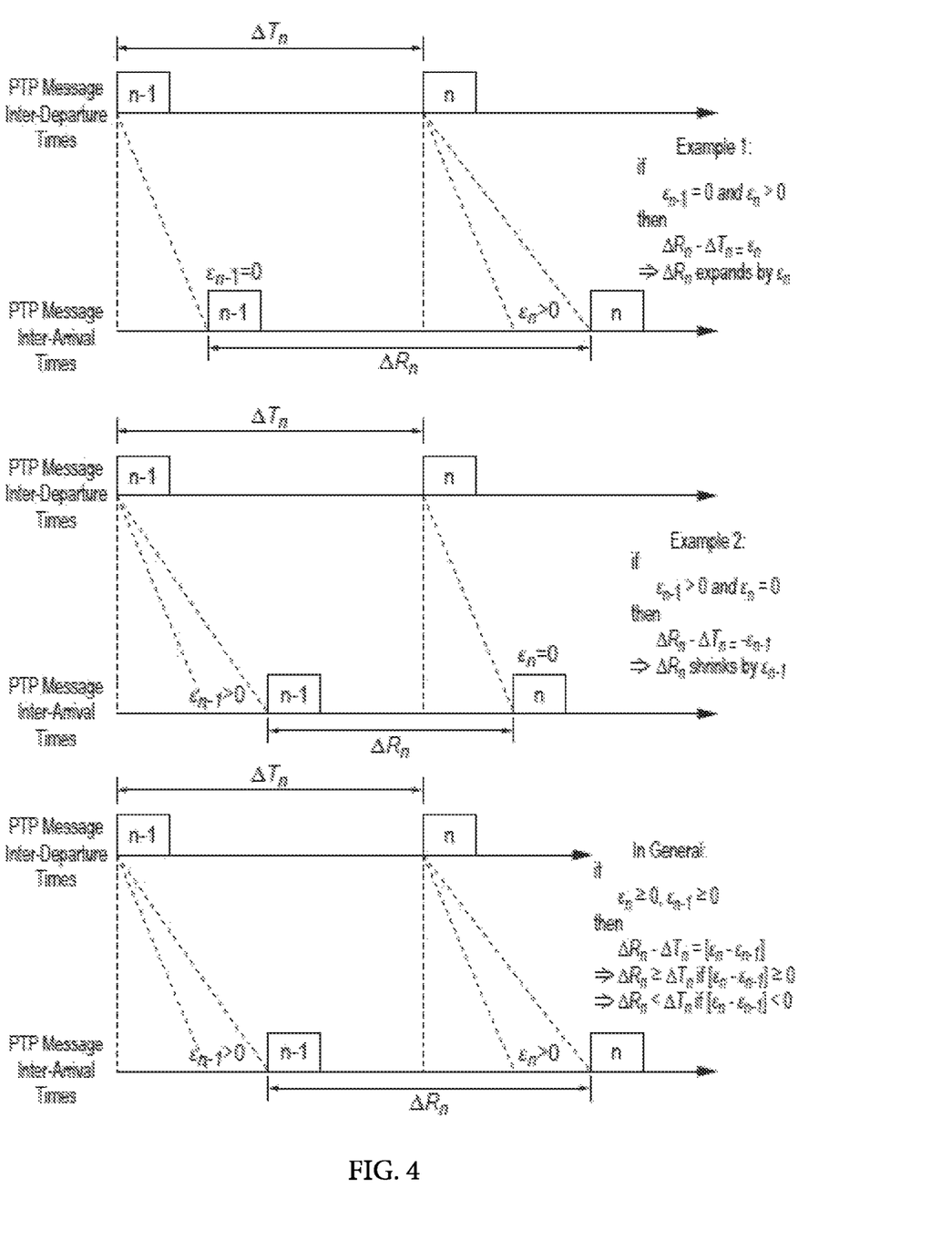
FIG. 4 shows, in schematic form, the effect of packet delay variation on message inter-arrival times.

The above equation can be extended to account for the case where the master clock 4 and slave clock 5 exchange messages over a communication link with delay. First, assume that the nth Sync message travels from a master to a slave experiences a fixed physical link (or propagation) delay of $d_f$ plus variable cumulative queuing (or stochastic) delay of $q_f(n)$ (see FIG. 3). Similarly, assume that the nth Delay_Req message sent from the slave 3 to the master 1 experiences a fixed delay of $d_r$ plus variable cumulative queuing delay of $q_r(n)$. An asymmetric path exists when the fixed delay components and/or queuing delay components in both directions are unequal. We assume that the physical link asymmetry is manually calibrated and compensated for but the queue-induced asymmetry can be compensated for using a technique as described in the embodiments below.

Equations 1 and 2 below are the two standard equations that describe the relationship between the timestamps exchanged between a master and a slave device in a time distribution network.

$$T_1(n) + q_f(n) = (1+\alpha(n))T_2(n) + \theta_0 \quad (1)$$

$$T_4(n) - q_r(n) = (1+\alpha(n))T_3(n) + \theta_0 \quad (2)$$

Where $T_1$, $T_2$, $T_3$ and $T_4$ are the timestamps from the standard one- or two-step clock message exchange under IEEE 1588.8 PTP ($T_1$ is the time of sending of a Sync message from the master to the slave according to the master clock; $T_2$ is the time of receipt of the Sync message according to the slave clock; $T_3$ is the time of sending of a Delay_Req message from the slave to the master according to the slave clock; and $T_4$ is the time of receipt of the Delay_Req message according to the master clock), $q_f[n]$ and $q_r[n]$ are the forward and reverse queueing delays and $\theta_0$ is the initial phase offset between the master and slave clocks; and α[n] is the slave clock skew with respect to master clock.

The fixed forward and reverse path delays are assumed to be known. The compensation of their impact on the final timing estimates at the slave is described in more detail in U.S. Pat. No. 9,112,628B, the contents of which are hereby incorporated by reference.

From this it can be shown that:

$$\Delta q_f(n)=(1+\alpha(n))\Delta T_2(n)-\Delta T_1(n) \quad (3)$$

$$\Delta q_r(n)=\Delta T_4(n)-(1+\alpha(n))\Delta T_3(n) \quad (4)$$

where equation (3) is derived as the difference between equation (1) for time samples n and (n−1) and equation (4) is derived as the difference between equation (2) for time samples n and (n−1). It is assumed for this subtraction that $\alpha(n) \cong \alpha(n-1)$.

As in U.S. Pat. No. 9,112,628B, $D_{fsum}(n)$ and $D_{rsum}(n)$ are defined as the summations of the forward and reverse displacements at time sample, n, respectively.

From equation 9 of U.S. Pat. No. 9,112,628:

$$D_{fsum}(n)=D_{fsum}(n-1)+D_e(n)$$

Where $D_e(n)$ is the difference in the forward displacement at time sample n. Using the skew corrected displacement values, as discussed in the above patent, equation (3) above can be used, thus:

$$D_{fsum}(n)=D_{fsum}(n-1)+\Delta q_f(n) \quad (5)$$

If it is assumed that the predetermined point at which the summation, defined by equation (5) above, commences is n=0, equation (5) can be expanded by setting $D_{fsum}(0)=0$ $$D_{fsum}(1)=D_{fsum}(0)+\Delta q_f(1)=\Delta q_f(1)=q_f(1)-q_f(0)$$

$$D_{fsum}(2)=D_{fsum}(1)+\Delta q_f(2)=(q_f(1)-q_f(0))+(q_f(2)-q_f(1))=q_f(2)-q_f(0)$$

$$D_{fsum}(3)=D_{fsum}(2)+\Delta q_f(3)=(q_f(2)-q_f(0))+(q_f(3)-q_f(2))=q_f(3)-q_f(0)$$

Thus by observation it can be seen that $D_{fsum}(n)$ tracks the forward delay at time instant n, but with an offset equal to the forward delay at the predetermined point chosen to commence the summation, i.e. as the above example started at instant n=0 the offset is $q_f(0)$.

This procedure can be repeated for the reverse direction, in which case $D_{rsum}(n)$ tracks the reverse delay at time instant n, but with an offset of $q_r(0)$.

Note that, in the above, the summations are continuous and all estimates of the forward and reverse delays are relative to the initial $q_f(0)$ and $q_r(0)$ respectively.

Now the minimum values of $D_{fsum}(n)$ and $D_{rsum}(n)$ can be found over a window of, for example, N samples.

It is known that $D_{fsum}(n)=q_f(n)-q_f(0)$ and thus it is desired to find the minimum value of $(q_f(n)-q_f(0))$ over all samples in the window from n=1 to n=N.

As $q_f(n)$ and $q_f(0)$ are both ≥0 and $q_f(0)$ is a fixed value over the entire window, the minimum value of $D_{fsum}(n)$, which we will call $MinD_{fsum}$, occurs when $q_f(n)$ is a minimum, which will be referred to as $q_{fmin}$.

Hence $MinD_{fsum}=q_{fmin}-q_f(0)$

Now the minimum value, $MinD_{fsum}$, for that window is subtracted from each value of $D_{fsum}(n)$ within the window:

$$D_{fsum}(n)-MinD_{fsum}=(q_f(n)-q_f(0))-(q_{fmin}(n)-q_f(0))=(q_f(n)-q_{fmin})$$

As $q_f(n)$ and $q_r(n)$ are derived by summing the estimated delay variations between subsequent samples, in reality $q_f(n)$ and $q_r(n)$ are only estimates of the true values. The standard notation "^" will be used to represent these estimates. Thus the estimated forward delay becomes $\hat{q}_f(n)$ and the estimated reverse delay becomes $\hat{q}_r(n)$. From simulations by the inventors it has been found that $\hat{q}_f(n)$ and $\hat{q}_r(n)$ track the true forward and reverse delays accurately.

Thus the above equation can be rewritten using "^" to represent estimates:

$$D_{fsum}(n)-MinD_{fsum}=(\hat{q}_f(n)-q_f(0))-(\hat{q}_{fmin}(n)-q_f(0))=(\hat{q}_f(n)-\hat{q}_{fmin})$$

Hence for each window a term which is approximately equal to the forward delay, minus an offset equal to the minimum value of the estimated forward delay, can be tracked in that window.

A similar procedure for the reverse direction means that an approximation to the reverse delay, minus an offset equal to the minimum of the estimated reverse delay, can also be tracked in that window, $(\hat{q}_r(n)-\hat{q}_{rmin})$.

The following equations relate the master and slave timestamps and the instantaneous value of the phase difference. Again it will be assumed that the fixed forward and reverse delays are addressed separately.

$$T_1(n)+q_f(n)=T_2(n)+\theta_T(n) \quad (6)$$

$$T_4(n)-q_r(n)=T_3(n)+\theta_T(n) \quad (7)$$

Adding 6 and 7 gives:

$$2\theta_T(n)=(T_1(n)+T_4(n))-(T_2(n)+T_3(n))+q_f(n)-q_r(n) \quad (8)$$

where $\theta_T$ is the true phase offset which could be calculated if the value of the instantaneous delay asymmetry, $q_f(n)-q_r(n)$ was known. In practice of course $q_f(n)-q_r(n)$ is unknown and hence the instantaneous phase offset is measured as:

$$2\theta_M(n)=(T_1(n)+T_4(n))-(T_2(n)+T_3(n)) \quad (9)$$

By observation of equations 8 and 9, the difference between the measured phase offset, $\theta_M(n)$, and the true phase offset, $\theta_T(n)$, is $(q_f(n)-q_r(n))/2$.

Most current implementations assume that, on average, there is no delay asymmetry. Thus when the phase offset, $\theta_M(n)$, is measured, the measurements at each time instant are offset by half the value of the delay asymmetry at that time instant, i.e., by $(q_f(n)-q_r(n))/2$. The variations in $(q_f(n)-q_r(n))$ occur every sample and can be quite large. These frequent and sometimes large changes make the task of estimating the phase offset difficult for any system. Ideally the $(q_f(n)-q_r(n))$ value would be removed before generating an estimate of, what would then be, the true phase estimate for each sample.

Unfortunately that cannot be done as only $(\hat{q}_f(n)-\hat{q}_{fmin})$ is known, and $\hat{q}_f(n)$ cannot be separated from $\hat{q}_{fmin}$ in a real-life implementation. Similarly $(\hat{q}_r(n)-\hat{q}_{rmin})$ is known and $\hat{q}_r(n)$ cannot be separated from $\hat{q}_{rmin}$. However, equation (8) can be manipulated such that the true phase offset estimate is impacted significantly less than if the delay asymmetry was not addressed at all.

It was shown above that it is possible to derive $(\hat{q}_f(n)-\hat{q}_{fmin})$ and $(\hat{q}_r(n)-\hat{q}_{rmin})$ for any window of samples of interest. Thus the following can also be derived by subtracting these two terms:

$$\hat{q}_f(n)-\hat{q}_r(n)-(\hat{q}_{fmin}-\hat{q}_{rmin})$$

This term can be subtracted from the r. h. s. of equation (8) and a new approximation to the true phase estimate, $\theta_T(n)$, that results can be redefined. Thus:

$$2\hat{\theta}_T(n)=(T_1(n)+T_4(n))-(T_2(n)+T_3(n))+(q_f(n)-q_r(n))-[(\hat{q}_f(n)-\hat{q}_{fmin})-(\hat{q}_r(n)-\hat{q}_{rmin})]$$

Rearranging gives:

$$2\hat{\theta}_T(n)=(T_1(n)+T_4(n))-(T_2(n)+T_3(n))+[(q_f(n)-\hat{q}_f(n))-(q_r(n)-\hat{q}_r(n))]-(\hat{q}_{fmin}-\hat{q}_{rmin}) \quad (10)$$

Again in practice $(q_f(n)-q_r(n))$ is unknown and hence true phase estimate, $\hat{\theta}_T(n)$, becomes $\theta_E(n)$ and is estimated as:

$$2\theta_E(n)=(T_1(n)+T_4(n))-(T_2(n)+T_3(n))-[(\hat{q}_f(n)-\hat{q}_{fmin})-(\hat{q}_r(n)-\hat{q}_{rmin})] \quad (11)$$

By comparing equations 11 and 8, it can be seen that the resultant phase difference between $\theta_E(n)$ and $\theta_T(n)$ due to the substituted asymmetry term, is:

$$(q_f(n)-q_r(n))-[(\hat{q}_f(n)-\hat{q}_{fmin})-(\hat{q}_r(n)-\hat{q}_{rmin})]$$

Rearranging this becomes:

$$[(q_f(n)-\hat{q}_f(n))-(q_r(n)-\hat{q}_r(n))]-(\hat{q}_{fmin}-\hat{q}_{rmin})$$

As already mentioned, it has been determined from simulation results that $(\hat{q}_f(n)-\hat{q}_r(n))$ is a very good estimate of $(q_f(n)-q_r(n))$. Hence the difference in the phase estimate is dominated by $(\hat{q}_{fmin}-\hat{q}_{rmin})$. This term is only updated at a frequency equal to the window length. The value of $(\hat{q}_{fmin}-\hat{q}_{rmin})$ will, also almost always, be smaller than $(q_f(n)-q_r(n))$. Given the less frequent, and in general smaller changes which result from adopting the formation in equation (11), the task of any estimation algorithm is much less challenging. Therefore equation (11) can be used as the basis for a phase estimation process, for example as outlined below.

Note that this approach can be used with any timing estimation algorithm. The ability to substitute for the delay asymmetry by a term that varies much less in absolute terms and also less frequently than the raw delay asymmetry will significantly increase the accuracy of estimation of any algorithm. As an example, the above delay asymmetry correction can be used in any of the algorithms presented in [3]. For example, equations (3), (6), (18), (19) in the above reference could be updated with the queuing delay estimates presented in the present application in order to achieve better conversion, precision and accuracy. Therefore the algorithm described in detail in the embodiment below is only an example of such an algorithm.

Phase Estimation Process

The phase estimation process according to an embodiment of the present invention employs equation (10) above to define the estimation process and produce the $\theta_E(n)$ estimates. The process is illustrated schematically in FIG. 5 and employs a Kalman filter acting on the timestamps, the queuing asymmetry measurement and a noise measurement to produce an estimated skew and an estimated phase offset for the slave clock.

Figure 5:
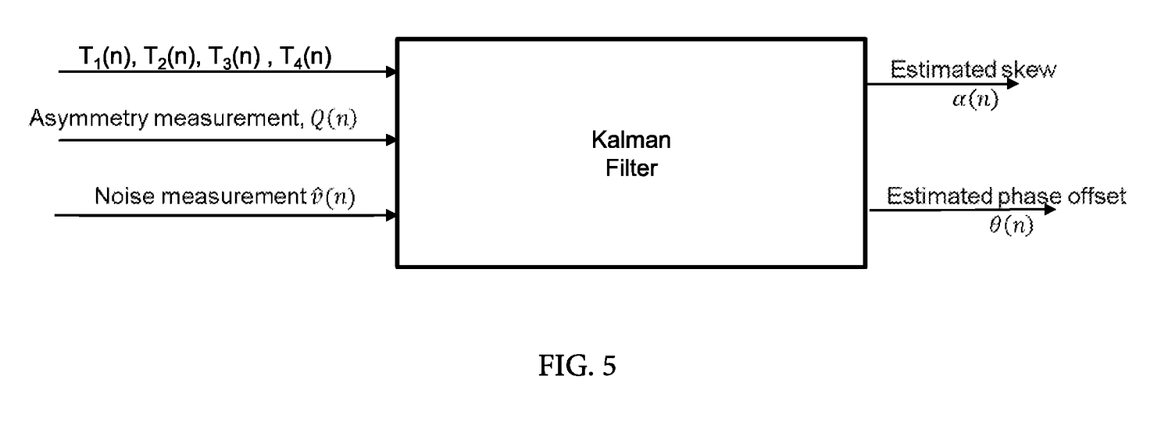
FIG. 5 shows, in schematic form, the operation of a method according to an embodiment of the present invention.

The time stamps $T_1(n)$, $T_2(n)$, $T_3(n)$ and $T_4(n)$ are measured at the master and slave as per well-established existing practice. The values of $(\hat{q}_f(n)-\hat{q}_{fmin})$ and $(\hat{q}_r(n)-\hat{q}_{rmin})$ are then generated as discussed above.

The Kalman filter is a particular example of an estimation algorithm that can take advantage of equation (11), although other estimation techniques could equally be employed. The conventional Kalman filter measurement equation is modified to accommodate equation (11). By rearranging equation (11), the measurement equation now becomes:

$$(T_1(n)+T_4(n))-(T_2(n)+T_3(n))-[(\hat{q}_f(n)-\hat{q}_{fmin})-(\hat{q}_r(n)-\hat{q}_{rmin})]=2\theta_E(n)+v_n$$

where the left-hand side of the above equation is the term $Y_n$, $v_n$ is the measurement noise, and the $2\theta_E(n)$ term is made up of the measurement matrix $D_n=[2\ 0]$ and the state vector $X_n=[\theta_E(n)\alpha(n)]$. All the other terms are as defined above. The Kalman filter state equation is unchanged as $X_n=A_nX_{n-1}+w_n$ where $A_n$ is a known M-by-M state transition matrix and $w_n$ is an M-dimensional process noise vector which is assumed to be drawn from a zero mean multivariate normal distribution with covariance $Q_n=E[w_n\cdot w_n^T]$, $w_n \sim N(0, Q_n)$. The prediction and update phases operate as has been previously described, for example in U.S. Pat. No. 9,112,628B.

Some additional challenges are faced in the phase estimation process:

1. When there is very high background traffic on one of the paths (forward or reverse), the minimum reference found within a window for the highly loaded path is significantly biased and will be much higher than the "true" minimum. Note that the "true" minimum refers to the minimum that would be discovered if there was no background load on that particular path. The solution discussed above is of course also impacted by the background load and hence the "true" minimum is not found even for lightly loaded situations. However, under light background load conditions, it is assumed that the forward and reverse minimum queuing delays are almost equal, hence the system can be considered symmetrical. For a system that is close to being symmetrical there is thus a negligible impact on the accuracy of the phase estimation. The specific challenge referred to here is the situation where there is very high background traffic on one of the paths.

2. As the estimated skew factor, $\alpha(n)$, from equations (1) and (2) has only limited precision, an error term, $\alpha_e(n)$, which represents the error between the true skew and the estimated skew, can be explicitly represented in these equations. The distribution of values of $\alpha_e(n)$ is a zero mean, approximately, Gaussian distribution. As $D_{fsum}(n)$ and $D_{rsum}(n)$ are cumulative summations (equation (5)) which are derived from equation (3) (and the corresponding summation derived from equation (4) for the reverse direction), both $D_{fsum}(n)$ and $D_{rsum}(n)$ manifest random walk behaviour (Wiener process-like). If the $MinD_{fsum}$ and $MinD_{rsum}$ happen to be separated significantly in time this Wiener 'drift' will introduce an error to the value of $[MinD_{fsum}-MinD_{rsum}]$. This in turn will increase the error in the phase offset estimation (which is impacted directly by $[MinD_{fsum}-MinD_{rsum}]$). It is therefore not possible to find the values, $MinD_{fsum}$ and $MinD_{rsum}$ during good conditions and simply use those values as the minimum value estimates in windows which occur much later. To address this Weiner drift a further novel technique is introduced as discussed below.

The equations which define $\Delta q_f$ and $\Delta q_r$, from equations (3) and (4) above, are reproduced below but now explicitly include the skew estimation error, $\alpha_e[n]$:

$$\Delta q_f(n)=(1+\alpha(n)+\alpha_e(n))\Delta T_2(n)-\Delta T_1(n) \quad (12)$$

$$\Delta q_r(n)=\Delta T_4(n)-(1+\alpha(n)+\alpha_e(n))\Delta T_3(n) \quad (13)$$

Note that, as the skew error has opposite signs in (12) and (13), the cumulative summation ($D_{fsum}(n)$) derived from equation (12) will drift in the opposite direction to the cumulative summation ($D_{rsum}(n)$) from equation (13). As the skew, $\alpha(n)$ is estimated using a Kalman filter, and the Kalman filter is effectively a whitening filter, the estimation error, $\alpha_e(n)$ will be very close to zero mean Gaussian white noise. The cumulative summations $D_{fsum}(n)$ generated from equation (12) and $D_{rsum}(n)$ produced from the corresponding reverse direction, equation (13), thus both suffer from random drift.

To address both of these problems the following approach is adopted:

1. When the conditions are favourable on both paths (see the next section on Noise Estimation), i.e., both the forward and reverse paths are lightly loaded, $MinD_{fsum}$ and $MinD_{rsum}$ are found as described above and these two values stored as reference points for future use. These will be called $MinD_{fsumref}$ and $MinD_{rsumref}$ for the forward and reverse directions respectively.
2. Under lightly loaded situations the $MinD_{fsum}$ and $MinD_{rsum}$ values continue to be found in every window. If w is used to represent the index of the windows, these values can be designated as $MinD_{fsum}(w)$ and $MinD_{rsum}(w)$ for window w. The computations of $MinD_{fsum}(w)$ and $MinD_{rsum}(w)$ will drift from $MinD_{fsumref}$ and $MinD_{rsumref}$ by the same absolute value, but in opposite directions due to the Weiner 'drift'. Thus, if the Weiner drift in the forward direction is defined as $WD_f$, then:

$$WD_f = MinD_{fsum}(w) - MinD_{fsumref} \quad (14)$$

And, if the Weiner drift in the reverse direction is defined as $WD_r$, then:

$$WD_r = MinD_{rsum}(w) - MinD_{rsumref} \quad (15)$$

And, thus as explained above:

$$WD_f = -WD_r \quad (16)$$

3. Now when heavy loaded conditions are encountered on one path (see the next section on Noise Estimation), say the reverse path, equations (14)-(16) can be employed to estimate $MinD_{rsum}(w)$ using the discovered minimum values $MinD_{fsum}(w)$ and the two reference values $MinD_{fsumref}$ and $MinD_{rsumref}$. Equally if the heavily loaded path is the forward path, $MinD_{fsum}(w)$ can similarly be estimated.

This can be represented as follows:
If the reverse path is less heavily loaded:

$$MinD_{fsum}'(w) = MinD_{fsumref} - MinD_{rsum}(w) + MinD_{rsumref} \quad (17)$$

If the forward path is less heavily loaded:

$$MinD_{rsum}'(w) = MinD_{rsumref} - MinD_{fsum}(w) + MinD_{fsumref} \quad (18)$$

where $MinD_{fsum}'(w)$ and $MinD_{rsum}'(w)$ are the re-estimated minimum values using the stored minimum reference values, the measured minimum on the less heavily loaded path and the relationship between them as defined by equations (14)-(16).

Noise Condition Estimation

To gain an understanding of current noise conditions, a number of statistical properties of $q_f(n)$ and $q_r(n)$, such as, mean, median, variance (and other statistical moments) can be tracked and compared. As the performance of the Kalman filter algorithm depends on noise variance, and for synchronization the majority of the noise comes from the variability of forward and reverse queueing delays, it is most appropriate to focus on the variance $\mathrm{var}\{q_f\}$ and $\mathrm{var}\{q_r\}$.

From probability theory it follows that variance of the first difference of a random variable is related to the variance of the random variable as follows:

$$\mathrm{var}\{\Delta X\} = 2\mathrm{var}\{X\} \quad (19)$$

Now using equations (3) and (19) it follows that one may compute $\mathrm{var}\{q_f\}$ and $\mathrm{var}\{q_r\}$ as follows:

$$\mathrm{var}\{q_f\} = \frac{1}{2}\mathrm{var}\{\Delta q_f\} = \frac{1}{2}\mathrm{var}\{(1+\alpha(n))\Delta T_2(n) - \Delta T_1(n)\} \quad (20)$$

$$\mathrm{var}\{q_r\} = \frac{1}{2}\mathrm{var}\{\Delta q_r\} = \frac{1}{2}\mathrm{var}\{\Delta T_4(n) - (1+\alpha(n))\Delta T_3(n)\} \quad (21)$$

Since the contribution of the term $\alpha(n)\Delta T_2(n)$ in (17) and term $\alpha(n)\Delta T_3(n)$ in (21) are both at least several orders of magnitude less than the term $\Delta T_2(n)$ in (20) and $\Delta T_3(n)$ in (21) respectively, the above equations can be re-written as:

$$\mathrm{var}\{q_f\} = \frac{1}{2}\mathrm{var}\{\Delta q_f\} \approx \frac{1}{2}\mathrm{var}\{\Delta T_2(n) - \Delta T_1(n)\} \quad (22)$$

$$\mathrm{var}\{q_r\} = \frac{1}{2}\mathrm{var}\{\Delta q_r\} \approx \frac{1}{2}\mathrm{var}\{\Delta T_4(n) - \Delta T_3(n)\} \quad (23)$$

To monitor and compare noise conditions on the forward and reverse paths, only the changes in $\mathrm{var}\{q_f\}$ and $\mathrm{var}\{q_r\}$ over time need to be tracked and this can be achieved using, for example, an Exponentially Weighted Moving Average (EWMA) filter as disclosed in U.S. Pat. No. 9,184,861, the contents of which are hereby incorporated by reference.

To categorize the noise conditions on the forward and reverse directions, the average value of the noise variance on the forward path and the average value in the reverse direction both need to be found during steady state periods (i.e., when no change is occurring). The noise condition is deemed to have changed from the current category to a new category if the noise variance has changed sufficiently from the steady state average.

A change detector can be implemented using two EWMA filters with different time constants, i.e., an EWMA filter with a long time constant which approximates the average value of a variable and one with a short time constant which is sensitive to changes in the variable. An EWMA filter can be defined as:

$$y(n) = (1-\mu)y(n) + \mu x(n) \quad (24)$$

where $\mu$ is the time constant (filtering factor) defined as follows:

$$\mu_Q = 1 - e^{(-1/\tau_Q)} \quad (25)$$

$$\mu_S = 1 - e^{(-1/\tau_S)} \quad (26)$$

and x(n) is the input variable which is being tracked (the outputs from (22) or (23) are both used in this case). Typically, $\tau_Q$ and $\tau_S$ can be set as 60 s and 600 s respectively. Now the detection is obtained by comparing the outputs of the two filters as follows:

$$e(n) = y_Q(n) - y_S(n) = (1-\mu_Q)y_Q(n-1) - (1-\mu_S)y_S(n-1) + x(\mu_Q - \mu_S) \quad (27)$$

The absolute value of e(n) (from (27)) for each input, $\mathrm{var}\{q_f\}$ or $\mathrm{var}\{q_r\}$, is compared to the same threshold. If |e(n)|>threshold, a change is considered to have been detected. The threshold can be set a-priori if the conditions of the detection environment are known in advance or the threshold can be determined experimentally during operation (or a combination of both).

Note that the sign of e(n) from (27) defines whether the conditions have improved, or have deteriorated. A positive sign indicates worse conditions, i.e., higher noise. Thus if the value |e(n)| exceeds the threshold, calculated with $\mathrm{var}\{q_f\}$ as input and e(n) is positive, then a load increase on the forward direction is indicated. Part of the error variance-covariance matrix, P, from a Kalman filter (for example as described earlier), can be used to provide the input variable for equation (27), instead of $\mathrm{var}\{q_f\}$ or $\mathrm{var}\{q_r\}$.

Matrix P is a square matrix defined as:

$$P = \begin{matrix} P_{11} & P_{12} \\ P_{21} & P_{22} \end{matrix} \quad (28)$$

where $P_{11}$ is error variance of the phase offset, $P_{22}$ is the error variance of the skew (fractional frequency offset), and $P_{12}$ and $P_{21}$ represent the error covariance between the phase offset and the skew. As the value $P_{22}$ depends on the oscillator's stability (OCXO in the case of telecom applications), its variance, i.e., the variance of the $P_{22}$ term itself, is extremely low (almost non-existent). $P_{22}$ changes significantly only due to the external noise (and the primary external noise input is caused by forward and/or backward traffic load changes). This has been verified in realistic conditions using simulation.

When external noise changes occur (i.e. the traffic load changes), $P_{22}$ reflects this by converging to a new stable level of error variance. Due to the filtering properties of the Kalman filter, this new level is, again, very stable (i.e., there is almost no variance). However, the magnitude of the new level will be very distinct from the previous state, provided there was a significant enough change in the noise conditions. Therefore, $P_{22}$ can be employed as input to (27) to provide reliable indications of changing load conditions. To determine whether the load on the forward or reverse direction has changed, the values var$\{q_f\}$ or var$\{q_r\}$, from equations (22) and (23), are examined to see which one has changed significantly from the average.

Using Sync-E to Improve the Accuracy of the Packet Delay Estimation

All packet delay estimation algorithms, including the algorithm presented above, are highly dependent on the accuracy of the skew estimate. Where Sync-E technology is available it provides very accurate frequency estimates. These Sync-E based frequency estimates would be much more precise than frequency estimations from other approaches, such as the Kalman filter.

The impact of Sync-E on estimation accuracy is obvious from equations (12) and (13), where the $\alpha_e$ term would be exceedingly small for Sync-E. If, $\alpha_e$ is small, the Wiener drift would also be exceedingly small and hence the packet delay estimation would be much more precise. The improved frequency estimation accuracy provided by Synch-E would also improve the performance of other parts of the synchronization system, further improving the overall accuracy of the master/slave phase offset estimation.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

References

1. U.S. Pat. No. 9,184,861 Aweya et al.—Method and devices for compensating for path asymmetry.
2. U.S. Pat. No. 9,112,628 Aweya et al.—Method and devices for synchronization.
3. A. Bletsas: "Evaluation of Kalman filtering for network time keeping," IEEE Trans. on Ultrason., Ferroel., and Freq. Control, 09/2005.

All references referred to above are hereby incorporated by reference.

The invention claimed is:

1. A method of synchronizing a local clock in a time client compared with a master clock in a time server connected to the time client over a network, the method including steps of:
within in a window of predetermined length, sending a plurality of first timing messages in a forward direction from the time server to the time client and a plurality of second timing messages in a reverse direction from the time client to the time server, and recording timestamps which are times of sending and times of receipt of the first and second timing messages;
for each message of the first and second timing messages in the window of predetermined length, determining an estimate of transmission delay experienced by the respective message to create a set of estimates of transmission delays of the plurality of first timing messages and the plurality of second timing messages in the window;
determining, from said set of estimates, a first minimum estimated delay experienced by the plurality of first timing messages in the window of predetermined length, and a second minimum estimated delay experienced by the plurality of second timing messages in the window of predetermined length;
determining a set of differences between the estimated transmission delay experienced by each first timing message in the window of predetermined length and the first minimum estimated delay, and between the estimated transmission delay experienced by each second timing message in the window of predetermined length and the second minimum estimated delay;

determining, from said set of differences, a queuing asymmetry measure for each exchange of first and second timing messages in the window of predetermined length;

estimating a phase offset of the local clock at a time in said window using said timestamps and said queuing asymmetry measure as inputs to an estimation algorithm; and synchronizing the local clock in the time client with the master clock in the time server based on the estimated phase offset.

2. The method according to claim 1, wherein the queuing asymmetry measure is determined as:

$$Q(n)=[(\hat{q}_f(n)-\hat{q}_{fmin})-(\hat{q}_r(n)-\hat{q}_{rmin})]$$

wherein:

$\hat{q}_f(n)$ is an estimate of a queuing delay experienced by a n-th first timing message;

$\hat{q}_r(n)$ is an estimate of a queuing delay experienced by a n-th second timing message;

$\hat{q}_{fmin}$ is a determined minimum value of $\hat{q}_f(n)$ in said window; and $\hat{q}_{rmin}$ is a determined minimum value of $\hat{q}_r(n)$ in said window.

3. The method according to claim 1, wherein the step of determining the queuing asymmetry measure includes:

determining, from said timestamps, a forward displacement factor which is a difference between an interval between times of receipt of successive first timing messages by the time client and an interval between times of sending of said successive first messages by the server;

determining, from said timestamps, a reverse displacement factor which is a difference between an interval between times of receipt of successive second timing messages by the server and an interval between times of sending of said successive second timing messages by the time client;

maintaining a running sum of forward displacement factors over a predetermined time period;

maintaining a running sum of reverse displacement factors over a predetermined time period; and calculating the queuing asymmetry measure from said sums.

4. The method according to claim 1, wherein the estimation algorithm is a Kalman filter which uses a measurement equation:

$$(T_1(n)-T_2(n))+(T_4(n)-T_3(n))+Q(n)=2\theta_E(n)+v_n$$

wherein:

$T_1(n)$ is a timestamp recorded by the server on sending of an n-th first timing message from the server to the time client;

$T_2(n)$ is the time of receipt as recorded by the time client on receipt of the n-th first timing message;

$T_3(n)$ is a timestamp recorded by the time client on sending of an n-th second timing message from the time client to the server;

$T_4(n)$ is the time of receipt as recorded by the server on receipt of the n-th second timing message;

$Q(n)$ is the queuing asymmetry measure;

$v_n$ is a measurement noise; and $\theta_E(n)$ is an estimate of a local clock offset.

5. A time client comprising a local clock and a processor, and connected over a network to a time server having a master clock, wherein the time client is configured to:

in a window of predetermined length, receive a plurality of first timing messages sent in a forward direction from the time server to the time client; and send a plurality of second timing messages in a reverse direction from the time client to the time server, record a first set of timestamps which are times of sending the plurality of second timing messages by the time client and times of receipt of the plurality of first timing messages by the time client; and receive a second set of timestamps which are times of sending the plurality of first timing messages by the time server and times of receipt of the plurality of second timing messages by the time server, wherein the processor is configured to:

for each message of the first and second timing messages in the window of predetermined length, determine an estimate of transmission delay experienced by the respective message to create a set of estimates of transmission delays of the plurality of first timing messages and the plurality of second timing messages in the window;

determine, from said set of estimates, a first minimum estimated delay experienced by the plurality of first timing messages in the window of predetermined length, and a second minimum estimated delay experienced by the plurality of second timing messages in the window of predetermined length;

determine a set of differences between the estimated transmission delay experienced by each first timing message in the window of predetermined length and the first minimum estimated delay, and between the estimated transmission delay experienced by each second timing message in the window of predetermined length and the second minimum estimated delay;

determine, from said set of differences, a queuing asymmetry measure for each exchange of first and second timing messages in the window of predetermined length;

estimate a phase offset of the local clock at a time in said window using said first set of timestamps and said second set of timestamps and said queuing asymmetry measure as inputs to an estimation algorithm; and synchronize the local clock in the time client with the master clock in the time server based on the estimated phase offset.

6. The time client according to claim 5, wherein the processor determines the queuing asymmetry measure as:

$$Q(n)=[(\hat{q}_f(n)-\hat{q}_{fmin})-(\hat{q}_r(n)-\hat{q}_{rmin})]$$

wherein:

$\hat{q}_f(n)$ is an estimate of a queuing delay experienced by a n-th first timing message;

$\hat{q}_r(n)$ is an estimate of a queuing delay experienced by a n-th second timing message;

$\hat{q}_{fmin}$ is a determined minimum value of $\hat{q}_f(n)$ in said window; and $\hat{q}_{rmin}$ is a determined minimum value of $\hat{q}_r(n)$ in said window.

7. The time client according to claim 5, wherein the estimation algorithm is a Kalman filter which uses a measurement equation:

$$(T_1(n)-T_2(n))+(T_4(n)-T_3(n))+Q(n)=2\theta_E(n)+v_n$$

wherein:

$T_1(n)$ is a timestamp recorded by the server on sending of an n-th first timing message from the server to the time client;

$T_2(n)$ is the time of receipt as recorded by the time client on receipt of the n-th first timing message;

$T_3(n)$ is a timestamp recorded by the time client on sending of an n-th second timing message from the time client to the server;

$T_4(n)$ is the time of receipt as recorded by the server on receipt of the n-th second timing message;

$Q(n)$ is the queuing asymmetry measure;

$v_n$ is a measurement noise; and $\theta_E(n)$ is an estimate of a local clock offset.

8. A networked time system comprising:

a time server having a master clock;

a time client having a local clock and a processor, and a network connecting the time server and the time client, wherein the time server is configured to:

in a window of predetermined length, send a plurality of first timing messages in a forward direction to the time client, and receive a plurality of second timing messages sent in a reverse direction from the time client, record a first set of server timestamps which are times of sending each timing message of the plurality first timing messages by the server and a second set of server timestamps which are times of receipt of each timing message of the plurality of second timing messages by the time server, and send said first and second sets of server timestamps to the time client, wherein the time client is configured to:

in the window of predetermined length, receive said first timing messages and send said second timing messages to the time server, record a first set of client timestamps which are times of sending of the second timing messages by the time client and a second set of client timestamps which are times of receipt of the first timing messages by the time client; and receive said first and second set of server timestamps, wherein the processor is configured to:

for each message of the first and second timing messages in the window of predetermined length, determine an estimate of transmission delay experienced by the respective message to create a set of estimates of transmission delays of the plurality of first timing messages and the plurality of second timing messages in the window;

determine, from said set of estimates, a first minimum estimated delay experienced by the plurality of first timing messages in the window of predetermined length, and a second minimum estimated delay experienced by the plurality of second timing messages in the window of predetermined length;

determine a set of differences between the estimated transmission delay experienced by each first timing message in the window of predetermined length and the first minimum estimated delay, and between the estimated transmission delay experienced by each second timing message in the window of predetermined length and the second minimum estimated delay;

determine, from said set of differences, a queuing asymmetry measure for each exchange of first and second timing messages in the window of predetermined length;

estimate a phase offset of the local clock at a time in said window using said first and second set of server timestamps and said first and second set of client timestamps and said queuing asymmetry measure as inputs to an estimation algorithm; and synchronize the local clock in the time client with the master clock in the time server based on the estimated phase offset.

9. The networked time system according to claim 8, wherein the processor determines the queuing asymmetry measure as:

$$Q(n)=[(\hat{q}_f(n)-\hat{q}_{fmin})-(\hat{q}_r(n)-\hat{q}_{rmin})]$$

wherein:

$\hat{q}_f(n)$ is an estimate of a queuing delay experienced by a n-th first timing message;

$\hat{q}_r(n)$ is an estimate of a queuing delay experienced by a n-th second timing message;

$\hat{q}_{fmin}$ is a determined minimum value of $\hat{q}_f(n)$ in said window; and $\hat{q}_{rmin}$ is a determined minimum value of $\hat{q}_r(n)$ in said window.

10. The networked time system according to claim 8, wherein the estimation algorithm is a Kalman filter which uses a measurement equation:

$$(T_1(n)-T_2(n))+(T_4(n)-T_3(n))+Q(n)=2\theta_E(n)+v_n$$

wherein:

$T_1(n)$ is a timestamp recorded by the server on sending of an n-th first timing message from the server to the time client;

$T_2(n)$ is the time of receipt as recorded by the time client on receipt of the n-th first timing message;

$T_3(n)$ is a timestamp recorded by the time client on sending of an n-th second timing message from the time client to the server;

$T_4(n)$ is the time of receipt as recorded by the server on receipt of the n-th second timing message;

$Q(n)$ is the queuing asymmetry measure;

$v_n$ is a measurement noise; and $\theta_E(n)$ is an estimate of a local clock offset.

* * * * *